United States Patent
Fujieda

(10) Patent No.: US 8,861,834 B2
(45) Date of Patent: Oct. 14, 2014

(54) COMPUTER IMPLEMENTED METHOD FOR RECOGNIZING AN OBJECT BASED ON A CORRESPONDENCE RELATIONSHIP BETWEEN OBJECT FEATURE POINTS AND PRE-REGISTERED MODEL FEATURE POINTS

(75) Inventor: Shiro Fujieda, Kyoto (JP)

(73) Assignee: Omron Corporation, Kyoto (JP)

( * ) Notice: Subject to any disclaimer, the term of this patent is extended or adjusted under 35 U.S.C. 154(b) by 792 days.

(21) Appl. No.: 12/529,910

(22) PCT Filed: Mar. 5, 2008

(86) PCT No.: PCT/JP2008/053938
§ 371 (c)(1),
(2), (4) Date: Sep. 3, 2009

(87) PCT Pub. No.: WO2008/111452
PCT Pub. Date: Sep. 18, 2008

(65) Prior Publication Data
US 2010/0098324 A1    Apr. 22, 2010

(30) Foreign Application Priority Data

Mar. 9, 2007    (JP) ................ P2007-059509

(51) Int. Cl.
*G06K 9/00* (2006.01)
*G06K 9/46* (2006.01)
*G01B 11/00* (2006.01)
*B25J 9/16* (2006.01)
*G06K 9/62* (2006.01)
*G06T 7/00* (2006.01)
*G01B 11/27* (2006.01)

(52) U.S. Cl.
CPC ............ *G06T 7/0028* (2013.01); *G01B 11/002* (2013.01); *B25J 9/1697* (2013.01); *G06K 9/6211* (2013.01); *G06T 2207/10012* (2013.01); *G01B 11/272* (2013.01); *G06T 7/0042* (2013.01); *G06T 2207/30164* (2013.01)
USPC ........................... 382/154; 382/201; 382/190

(58) Field of Classification Search
None
See application file for complete search history.

(56) References Cited

U.S. PATENT DOCUMENTS

| | | | |
|---|---|---|---|
| 6,532,304 B1 * | 3/2003 | Liu et al. | 382/203 |
| 6,668,082 B1 * | 12/2003 | Davison et al. | 382/190 |
| 2004/0190766 A1 * | 9/2004 | Watanabe et al. | 382/154 |
| 2006/0204079 A1 * | 9/2006 | Yamaguchi | 382/154 |
| 2006/0227041 A1 | 10/2006 | Okamoto | |
| 2006/0256114 A1 * | 11/2006 | Nielsen et al. | 345/440 |
| 2006/0285752 A1 * | 12/2006 | Fujieda et al. | 382/199 |
| 2009/0041340 A1 * | 2/2009 | Suzuki et al. | 382/159 |

FOREIGN PATENT DOCUMENTS

| | | |
|---|---|---|
| EP | 1 139 270 A2 | 10/2001 |
| JP | 08-030783 | 2/1996 |
| JP | 08-030783 A | 2/1996 |
| JP | 2001-250122 A | 9/2001 |
| JP | 2003-242509 A | 8/2003 |
| JP | 2004-295223 A | 10/2004 |
| JP | 2005-063463 | 3/2005 |
| JP | 2005-346232 A | 12/2005 |
| JP | 2006-252473 A | 9/2006 |
| JP | 2007-249256 A | 9/2007 |
| WO | WO2006073076 A1 * | 6/2006 |

OTHER PUBLICATIONS

Yamaguchi, Osamu, et al.; Pattern Hashing: Distributed Appearance Model Using Local Images and Invariant Indexing; vol. 44, No. SIG5(CVIM6); Apr. 15, 2003; p. 64-73.

Li, Baihua, et al.; Point Pattern Matching and Applications—a Review; 2003 IEEE International Conference on Systems, Man, and Cybernetics, vol. 1, Oct. 5, 2003; pp. 729-736.

Cox G. S. et al.; A Survey of Point Pattern Matching Techniques and a new Approach to Point Pattern Recognition; Communications and Signal Processing (COMSIG'92), 1992; pp. 243-248.

European Patent Office extended search report on application 08721358.3 dated Jan. 26, 2012; 7 pages.

\* cited by examiner

*Primary Examiner* — Jason M Repko
*Assistant Examiner* — Jhere Rowland
(74) *Attorney, Agent, or Firm* — Foley & Lardner LLP

(57) ABSTRACT

A recognition processing method and an image processing device ends recognition of an object within a predetermined time while maintaining the recognition accuracy. The device extracts combinations of three points defining a triangle whose side length satisfy predetermined criterion values from feature points of the model of a recognition object, registers the extracted combinations as model triangles, and similarly extracts combinations of three points defining a triangle whose side lengths satisfy predetermined criterion values from feature points of the recognition object. The combinations are used as comparison object triangles and associated with the respective model triangles. The device calculates a transformation parameter representing the correspondence relation between each comparison object triangle and the corresponding model triangle using the coordinates of the corresponding points (A and A', B and B', and C and C'), determines the goodness of fit of the transformation parameters on the relation between the feature points of the model and those of the recognition object. The object is recognized by specifying the transformation parameters representing the correspondence relation between the feature points of the model and those of the recognition object according to the goodness of fit determined for each association.

6 Claims, 11 Drawing Sheets

Model image

Image to be processed

* # COMPUTER IMPLEMENTED METHOD FOR RECOGNIZING AN OBJECT BASED ON A CORRESPONDENCE RELATIONSHIP BETWEEN OBJECT FEATURE POINTS AND PRE-REGISTERED MODEL FEATURE POINTS

TECHNICAL FIELD

The present invention relates to a method of recognizing the position and attitude of a recognition object based on a correspondence relationship between a set of points (hereinafter also referred to as "feature points") representing features of the recognition object and pre-registered feature points of a model for the recognition object, and to an image processing device using the recognition processing method.

BACKGROUND ART

Typical methods for recognizing the position and attitude of a recognition object in an image to be processed through two-dimensional image processing include a method that acquires correlation values between a pre-registered model image and the image to be processed (see, e.g., Patent Document 1). In addition, there is also a case in which the three-dimensional coordinates of a plurality of feature points of a recognition object are calculated by means of three-dimensional measurement processing using a stereo camera, followed by calculation of obtaining correlation values between a distribution pattern of these feature points and a distribution pattern of feature points of a model in a three-dimensional space, thereby recognizing the position and attitude of the recognition object in the space (see, e.g., Patent Document 2).
Patent Document 1: Japanese Patent Application Laid-Open No. 2005-346232
Patent Document 2: Japanese Patent Application Laid-Open No. 2004-295223

In the two-dimensional image processing, in addition to being different in position and orientation from the model, a recognition object is sometimes changed in the size in its image due to variation in distance between the camera and recognition objects. Thus, in order to accurately recognize an object to be measured that is in a different condition from the model image, conventionally, a plurality of kinds of model images that are different in orientation and size from one another are typically registered, and correlation values are calculated per model image. According to such a method, however, the more the number of matching operations with the model images, the longer the time taken for the processing.

The three-dimensional recognition processing involves repetition of the process of varying the positions and directions of the feature points of the model to acquire the correlation values with respect to feature points of a recognition object. In this case also, the more diverse the position-direction combinations of the feature points of the model, the longer the time taken for the processing.

As described above, both in the two-dimensional and three-dimensional processing, processing time becomes longer to achieve a high degree of recognition accuracy. As this kind of recognition processing is performed as pre-processing for a measurement or an inspection in many cases, it is not desirable to take much time for the processing.

The present invention was made in view of the foregoing problems, and it is an object of the invention to finish processing in a predetermined period of time while maintaining a certain degree of recognition accuracy.

DISCLOSURE OF THE INVENTION

A recognition processing method for overcoming the foregoing problems provides recognition of a recognition object based on a correspondence relationship between feature points of the recognition object and pre-registered feature points of a model, the feature points being distributed in a plane or a space, and the method has a feature that the following steps (i) to (iv) are performed.

In the (i) step, model combinations are set out of combinations each made up of a particular number n (n≥2) of feature points of the feature points of the model, the distance between at least a pair of feature points of each model combination meeting a predefined criterion value, and information for specifying the set model combinations is registered in a memory. In the (ii) step, comparison object combinations are set out of combinations each made up of the particular number n of feature points of the feature points of the recognition object, the distance between at least a pair of feature points of each comparison object combination meeting the criterion value. In the (iii) step, the model combinations specified by the registered information in the memory are associated with the comparison object combinations in turn, a transformation parameter for a case of transforming the feature points of one of the combinations into the feature points of the other combination is obtained per associated combinations, and goodness of fit of the transformation parameter is determined on a relationship between the feature points of the model and the feature points of the recognition object. In the (iv) step, based on each goodness of fit obtained in the (iii) step, a transformation parameter indicating the correspondence relationship between the feature points of the model and the feature points of the recognition object is specified.

Even when a recognition object is different in position and attitude from its model, if corresponding points are known with respect to a predetermined number of feature points of the model, it is possible to obtain a transformation parameter for transforming the feature points of the model into a similar condition to that of the feature points of the recognition object using the coordinates of the feature points in the correspondence relationship. This principle is used oppositely in the above method.

That is, according to the method, although the correspondence relationship between the feature points of the model and those of the recognition object is not known, it is assumed that n feature points extracted from both of the feature points are in a correspondence relationship, and a transformation parameter indicating the relationship therebetween is obtained. If these feature points are actually in a correspondence relationship, a relationship between other feature points of the feature points can be expressed by a similar transformation parameter; therefore, in the case where the feature points of the recognition object or of the model are transformed using the transformation parameter, the degree of the transformed coordinates' matching the other feature points is considered to be higher than the degree of matching in the case of a transformation parameter obtained from a combination in which association of feature points are not made properly. Accordingly, for the transformation parameter obtained for each association of combinations of feature points, goodness of fit is calculated on a relationship between the feature points of the model and those of the recognition object, and by specifying a transformation parameter yielding maximum goodness of fit out of the calculated goodnesses of fit, the position, attitude, and the like of the recognition object can be recognized highly accurately.

It should be noted that the transformation parameter to be specified is desirably, but not limited to, a transformation parameter yielding maximum goodness of fit in all the associated combinations. For example, the process may be terminated at the point where the goodness of fit reaches a predefined target value in the course of association, and the transformation parameter providing that goodness of fit may be specified.

According to the method, the recognition object can be recognized highly accurately. In addition, the combinations by n feature points can be narrowed down in number by adjusting the criterion value for the inter-feature-point distance, it is possible to avoid calculation of the transformation parameters and their goodness of fit taking too much time.

In the above method, in the case where the feature points to be processed are a set of feature points included in an image of the recognition object, the particular number n may be set not less than two in the (i) and (ii) steps. In this case, the correspondence relationship between the feature points can be expressed with transformation parameters for affine transformation.

In the case where the feature points to be processed are a set of spatial feature points obtained through a three-dimensional measurement process on the recognition object, the particular number n may be set not less than three in the (i) and (ii) steps. In this case, the correspondence relationship between the feature points can be expressed with transformation parameters for homogenous coordinate transformation.

According to a preferred aspect of the above method, in the (i) and (ii) steps, the particular number n is set to three, and such combinations of feature points are set as to constitute a triangle whose side lengths each have a value between a predetermined upper limit and a predetermined lower limit. The triangle is the smallest unit representing a plane and is convenient for describing the size and shape of the recognition object. Also, association of the model combinations with the comparison object combinations may be made in no more than six ways in the case of three points and is thus facilitated.

According to a further preferred aspect, in the (i) and (ii) steps, such combinations of feature points are set as to constitute an equilateral triangle whose side length has a value between the upper and lower values. By doing so, the number of combinations of feature points can be cut down significantly, and high speed processing can be achieved. This is also advantageous for the user because the set state of triangles relative to the object can be easily envisaged, facilitating the setting of the upper and lower limits.

According to another aspect wherein the particular number n is set to three, in the (i) and (ii) steps, such combinations of feature points are set as to constitute a triangle any one of whose sides has a length value between a predetermined upper limit and a predetermined lower limit and the angles at both ends of the side each fall within a predefined criterion angle range. According to still another aspect, such combinations of feature points are set as to constitute a triangle two of whose sides each have a length value between a predetermined upper limit and a predetermined lower limit and the angle formed by the sides falls within a predefined criterion angle range.

According to these aspects also, the number of combinations of feature points can be limited based on the side lengths and angles of the triangles, and the processing time can therefore be shortened.

According to another preferred aspect of the recognition processing method, in the (iii) step, after the transformation parameter is obtained for a model combination and a comparison object combination that are associated with each other, either the feature points of the model or the feature points of the recognition object are transformed using the transformation parameter, and a numerical value indicating frequency of the transformed feature points' matching the non-transformed feature points is set as the goodness of fit of the transformation parameter.

According to the above aspect, the goodness of fit of the transformation parameter on the relationship between the feature points of the model and those of the recognition object can be obtained as a specific numerical value. Accordingly, comparing numerical values indicating goodness of fit allows easy specification of a transformation parameter indicating the correspondence relationship between the feature points of the model and those of the recognition object. Also, in the case where the feature points of the model are transformed, even if the recognition object is larger than the model and the feature points to be processed are increased, it is possible to prevent the time required for calculating goodness of fit from being increased.

A first image processing device to which the above recognition processing method is applied performs acquisition of a plurality of feature points of a recognition object that are distributed in a plane or a space by means of processing on an image of the recognition object, and recognition of the recognition object based on a correspondence relationship between the feature points and pre-registered feature points of a model. The image processing device includes: input means for inputting a predetermined criterion value for the inter-feature-point distance of the feature points; model setting means for setting model combinations out of combinations each made up of a particular number n (n≥2) of feature points of the feature points of the model, the distance between at least a pair of feature points of each model combination meeting the criterion value; registering means for registering in a memory information for specifying the model combinations set by the model setting means; combination setting means for setting comparison object combinations out of combinations each made up of the particular number n of feature points of the feature points extracted from the input image, the distance between at least a pair of feature points of each comparison object combination meeting the criterion value; matching means for associating in turn the model combinations specified by the registered information in the memory with the comparison object combinations, obtaining per associated combinations a transformation parameter for a case of transforming the feature points of one of the combinations into the feature points of the other combination, and determining goodness of fit of the transformation parameter on a relationship between the feature points of the model and the feature points of the recognition object; and specifying means for specifying a transformation parameter indicating the correspondence relationship between the feature points of the model and the feature points of the recognition object, based on each goodness of fit determined by the matching means.

In the case where the above device is provided as an image processing device for two-dimensional recognition processing, it is possible to determine the position and attitude of a recognition object in an image using a finally specified transformation parameter, and to output the result of the determination. It is also possible to correct deviation of the image by transforming each point in the image to be processed using the specified transformation parameter, and thereafter to perform image processing such as pattern recognition on the corrected image.

In the case where the above device is provided as an image processing device for three-dimensional recognition processing, it is possible to determine the position and attitude of a recognition object in a space using a finally specified transformation parameter, and to output the result of the determination. It is also possible to transform particular points in the model using the specified transformation parameter, thereby recognizing points corresponding to the particular points in the recognition object.

A second image processing device to which the above recognition processing method is applied performs input of images from a plurality of photographing devices installed to photograph a plurality of recognition objects having the same shape, acquisition of the space coordinates of a plurality of feature points of each recognition object that are distributed in a space through a three-dimensional measurement process using the input images, and individual recognition of the plurality of recognition objects based on a correspondence relationship between the feature points and pre-registered feature points of a model. The image processing device includes: input means for inputting a predetermined criterion value for the inter-feature-point distance of the feature points; model setting means for setting model combinations out of combinations each made up of a particular number n (n≥3) of feature points of the feature points of the model, the distance between at least a pair of feature points of each model combination meeting the criterion value; registering means for registering in a memory information for specifying the model combinations set by the model setting means; combination setting means for setting comparison object combinations out of combinations each made up of the particular number n of feature points of the feature points acquired through the three-dimensional measurement, the distance between at least a pair of feature points of each comparison object combination meeting the criterion value; matching means for associating in turn the model combinations specified by the registered information in the memory with the comparison object combinations set by the combination setting means, obtaining per associated combinations a transformation parameter for a case of transforming the feature points of one of the combinations into the feature points of the other combination, and determining goodness of fit of the transformation parameter on a relationship between the feature points of the model and the feature points of each recognition object; and object recognizing means for specifying at least one of the goodnesses of fit determined by the matching means, the goodness of fit being above a predetermined criterion value, and recognizing one recognition object per specified goodness of fit using the transformation parameter corresponding to the goodness of fit.

With the above image processing device, even when a plurality of recognition objects having the same shape are placed in various orientations, each of the recognition objects can be distinguished from one another accurately in a short time.

According to the above recognition processing method and the image processing devices, based on the principle that a common transformation parameter can be applied to feature points that are in a correspondence relationship of the feature points of the recognition object and of the feature points of the model, the correspondence relationship between the feature points can be recognized accurately. Also, even when the position and attitude of the recognition object are changed, the number of feature points is not changed vastly, so that processing time will not be extended. Moreover, since the combinations of feature points to be matched to each other can be narrowed down by adjusting the criterion value for the inter-feature-point distance according to the size and shape of the recognition object, processing time can be shortened thereby.

BEST MODE FOR CARRYING OUT THE INVENTION

Figure 1:
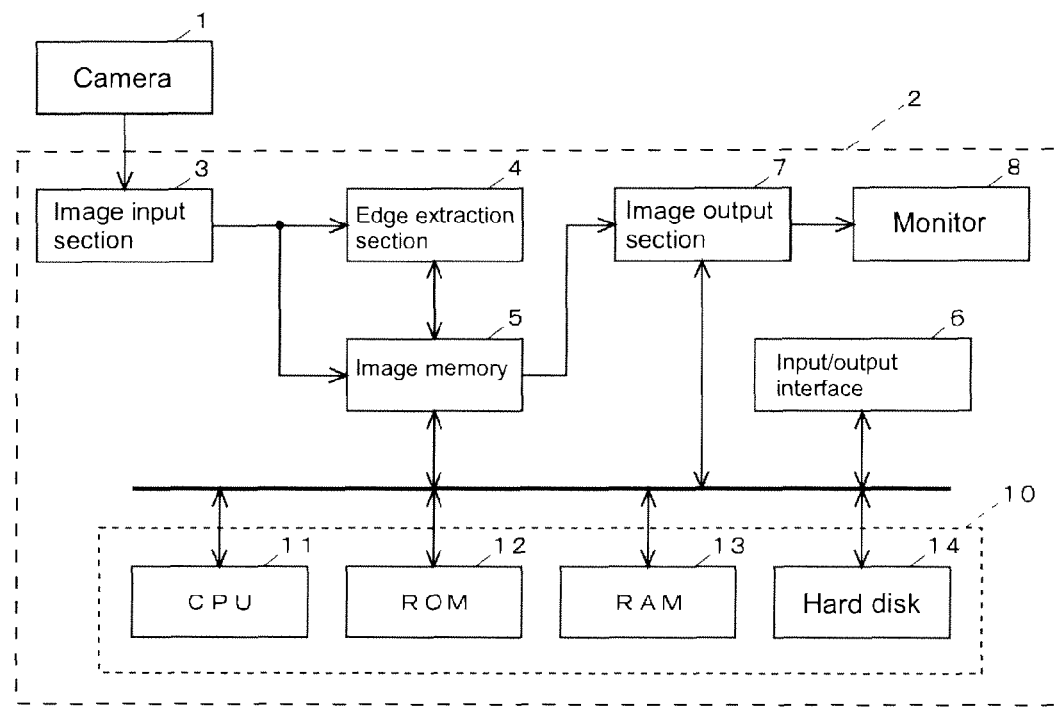
FIG. 1 shows a block diagram of an image processing device.

FIG. 1 shows a configuration of an image processing device according to one embodiment of the present invention.

The image processing device photographs recognition objects of substantially the same shape and size, such as industrial products and printed materials, one object at a time to recognize the respective positions and attitudes of the recognition objects in the generated images, and includes a photographing camera 1 and a controller 2.

The controller 2 includes an image input section 3, an edge extraction section 4, an image memory 5, an input/output interface 6, an image output section 7, a monitor 8, and a control section 10. The image input section 3 includes an interface for the camera 1 and an A/D converter circuit and accepts input of grayscale image signals from the camera 1 to convert them to a digital image. The converted digital image is stored in the image memory 5 while being supplied to the edge extraction section 4.

The edge extraction section 4 includes a derivative circuit that differentiates the digital image to calculate by pixels magnitudes of gradient and a comparator circuit that compares the calculated magnitudes of gradient with a predetermined threshold. Through the processing of these circuits, the digital image is converted to a binary edge image with the edge constituent pixels in black and the other pixels in white. The converted edge image is also stored in the image memory 5.

The input/output interface 6 is connected to an input section (a keyboard or a mouse) and an external device that are not shown. The image output section 7 is comprised of a D/A converter circuit and an interface circuit for the monitor 8. The image output section 7 is capable of reading data to be displayed from the image memory 5 or a RAM 13 in response to an instruction from the control section 10 and displaying the data on the monitor 8.

The control section 10 is configured by a CPU 11, a ROM 12, the RAM 13, and a hard disk 14. The hard disk 14 stores programs, setting data, and the like that are necessary for performing a recognition process. The RAM 13 stores combinations of feature points that are set through the process based on these programs and setting data, as well as data representing a degree of matching to be described later and the like.

Although not shown in FIG. 1, when an object to be measured comes into the field of view of the camera 1, a trigger signal is inputted into the camera 1 from a sensor (not shown) or the CPU 11. The camera 1 conducts photographing in response to the trigger signal. In the following description, the digital image of the recognition object that is generated through the photographing is referred to as an "image to be processed", and the recognition object is simply referred to as an "object".

The hard disk 14 retains model images acquired by photographing a model for the object in advance and the edge image thereof as well as information relating to model triangles to be described later.

When an image to be processed of the object and the edge image thereof are stored in the image memory 5, the CPU 11 first uses the edge image to match feature points distributed in the image (hereinafter referred to as "feature points to be processed"; the feature points in the present embodiment is a set of edge constituent points) to feature points in the edge image of the model (hereinafter referred to as "feature points of the model"), thereby recognizing the position and orientation of the object. Moreover, based on the result of the recognition, a measurement area is set in a range including the object in the image to be processed, the attitude of the object in the measurement area is corrected to an attitude similar to that in the model image, and thereafter the process transits to a main measurement process or inspection process.

A detailed description is given below on the process of matching feature points to be processed with feature points of the model.

The position and orientation of the object in the image to be processed is different from those in the model image in many cases. The size may also be different from the size in the model image depending on the distance to the camera 1.

Accordingly, where the coordinates of a feature point of the feature points of the model are ($mx_i$, $my_i$) and the coordinates of a point corresponding to ($mx_i$, $my_i$) in the feature points to be processed are ($tx_i$, $ty_i$), ($tx_i$, $ty_i$) can be considered as corresponding to the affine-transformed coordinates of ($mx_i$, $my_i$).

Here, where the amounts of positional displacement of the object in the x and y directions are dx and dy, respectively, the angle of rotation of the object relative to the model is θ, the magnification in the x direction of the object to be measured relative to the model is bx, and the magnification in the y direction is by, the relationship between the above two points can be expressed as the following equation (1):

[Equation 1]

$$\begin{pmatrix} txi \\ tyi \end{pmatrix} = \begin{pmatrix} bx\cdot\cos\theta & -by\cdot\sin\theta & dx \\ bx\cdot\sin\theta & by\cdot\cos\theta & dy \end{pmatrix} \begin{pmatrix} mxi \\ myi \\ 1 \end{pmatrix} = H \cdot \begin{pmatrix} mxi \\ myi \\ 1 \end{pmatrix} \quad (1)$$

As shown in the above equation (1), in the two-dimensional image processing, the correspondence relationship between the model and the object can be expressed with the five parameters of dx, dy, θ, bx, and by. In the following description, these parameters are referred to as transformation parameters, and the matrix H specified by these transformation parameters is referred to as a transformation matrix. The transformation matrix H can be thought of as a transformation parameter in a broad sense. Accordingly, the process of obtaining this transformation matrix H or dx, dy, θ, bx, and by can provide recognition of the state of the object.

Equations (1-1) and (1-2) can be derived through expansion of the equation (1):

$$tx_i = mx_i \cdot T_{00} + my_i \cdot T_{01} + T_{02} \quad (1\text{-}1)$$

$$ty_i = mx_i \cdot T_{10} + my_i \cdot T_{11} + T_{12} \quad (1\text{-}2)$$

where $T_{01}$ to $T_{12}$ are substitutes for the following elements of the transformation matrix H:

$T_{00} = bx \cdot \cos\theta$     (a)

$T_{01} = -by \cdot \sin\theta$     (b)

$T_{02} = dx$     (c)

$T_{10} = bx \cdot \sin\theta$     (d)

$T_{11} = by \cdot \cos\theta$     (e)

$T_{12} = dy$     (f)

According to the above, where the coordinates of three points of the feature points of the model are each ($mx_i$, $my_i$), if it is possible to locate the coordinates ($tx_i$, $ty_i$) of points corresponding to these three points in the feature points to be processed, the combinations of coordinates of the corresponding points can be applied to the equations (1-1) and (1-2) to establish three simultaneous equations. By solving these simultaneous equations, the values of $T_{00}$ to $T_{12}$ can be obtained, so that the transformation matrix H can be specified.

When the values of $T_{00}$ to $T_{12}$ are found, dx and dy can be specified by the values of $T_{02}$ and $T_{12}$ (see the equations (c) and (f)). Also, θ can be found using the values of $T_{00}$ and $T_{10}$ (as $\tan\theta = \sin\theta/\cos\theta = (T_{10}/T_{00})$ according to the equations (a) and (d), $\theta = \tan^{-1}(T_{10}/T_{00})$). Further, when the value of θ is found, the values of bx and by can also be found according to the equations of (a), (b), (d), and (e).

As described above, when it is possible to specify three or more sets of feature points that are in a correspondence relationship between the feature points to be processed and the features points of the model, various transformation parameters can be obtained through calculation using the coordinates of these points.

Based on the above observation, in the present embodiment, an unknown transformation matrix H is found through a calculation process using the coordinates of feature points of a model and of feature points to be processed, thereby recognizing the object.

In this process, a plurality of sets of three feature points constituting a triangle that satisfies a predetermined condition are extracted in advance from the feature points of the model, and the combinations of these feature points are registered. In the following description, each combination of three feature points is considered as a triangle composed of the respective feature points and thus referred to as a model triangle.

Also with respect to the feature points to be processed, a plurality of combinations of three feature points are extracted under the same condition as that applied to the feature points of the model (these combinations of feature points are hereinafter referred to as "comparison object triangles"). The above-mentioned model triangles are associated with the comparison object triangles in turn, and for each association, on the assumption that the association is made correctly, the coordinates of the vertices of each triangle are applied to the equations (1-1) and (1-2) to calculate a transformation matrix H. In addition, of the transformation matrices H that are obtained per association, a transformation matrix H that most accurately represents the correspondence relationship between the feature points of the model and the feature points to be processed (hereinafter referred to as an "optimal transformation matrix H") is specified, based on the degree to which the feature points of the model that are transformed with each transformation matrix H match the feature points to be processed (hereinafter referred to as "goodness of fit of the transformation matrix H" or simply as "goodness of fit").

Moreover, in the present embodiment, that the value of each side length falls within a predetermined numerical range (defined by an upper limit $d_H$ and a lower limit $d_L$ to be described later) is set as a condition for extraction of the model triangles and the comparison object triangles. The upper and lower limits $d_H$ and $d_L$ can be altered freely through the user input.

Figure 2:
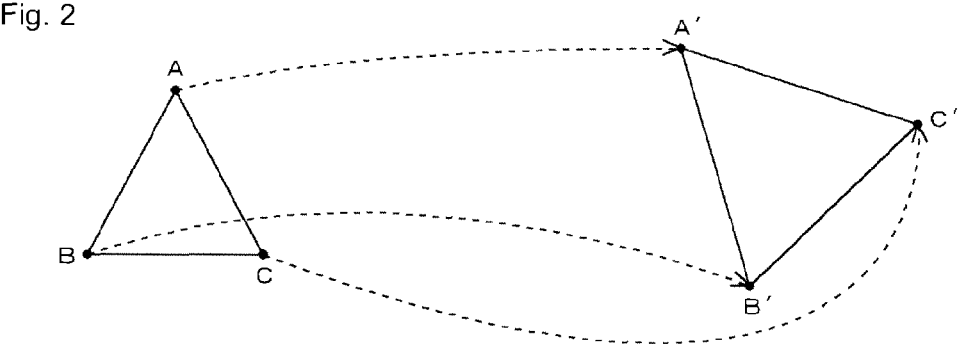
FIG. 2 shows an illustration of exemplary association of triangles.

FIG. 2 shows exemplary association of a model triangle with a comparison object triangle.

In the association process, with respect to the vertices A, B, and C of a model triangle, a vertex in a comparison object triangle is assumed to be a vertex A' corresponding to the vertex A, another vertex a vertex B' corresponding to the vertex B, and the remaining vertex a vertex C' corresponding to the vertex C. It should be noted that, since the correspondence relationship between the feature points is not at all known yet, association in six ways needs to be made by changing the correspondence relationship between the vertices.

Whether a transformation matrix H obtained through association of the vertices A, B, and C with the vertices A', B', and C' is optimal or not is determined based on the above-mentioned goodness of fit. In the present embodiment, each of the feature points of the model is transformed using a transformation matrix H, search is conducted in the feature points to be processed whether there is a feature point at a position close to the transformed coordinates, and the rate of hitting the feature point is determined as the goodness of fit.

If an association of the vertices A, B, and C with the vertices A', B', and C' is correct, it is considered that the transformation of each of the feature points of the model using the transformation matrix H obtained based on the association indicates at a high level of accuracy a corresponding point at the transformed coordinates or a position proximate thereto; therefore, the goodness of fit is presumably higher than that provided by a transformation matrix H obtained through incorrect association.

Accordingly, in the present embodiment, a transformation matrix H that provides a maximum degree of matching is specified as an optimal transformation matrix, and the recognition process for the object is performed based on the specified transformation matrix.

Figure 3:
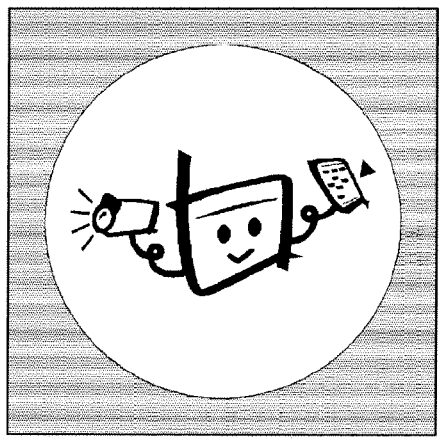
FIG. 3 shows an illustration of a model image and an image to be processed as well as their edge images, along with a correspondence relationship between feature points.
Figure 3:
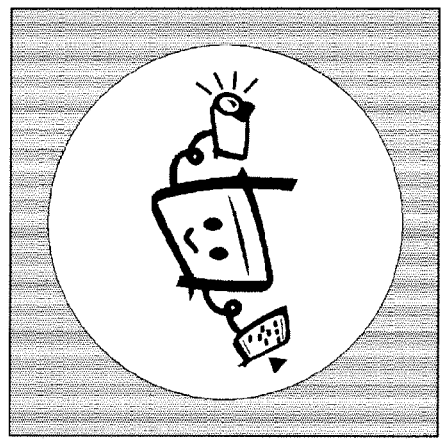
Figure 3:
Figure 3:
Figure 3:
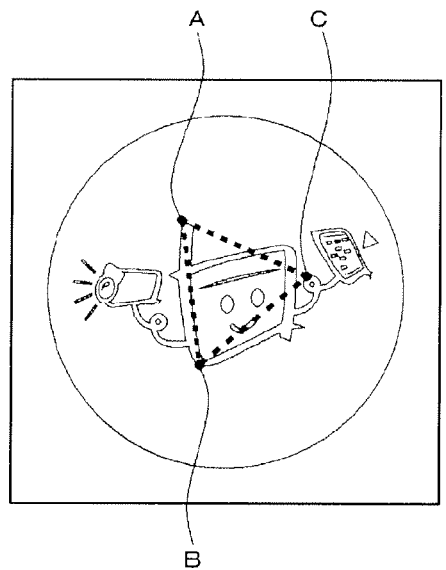
Figure 3:
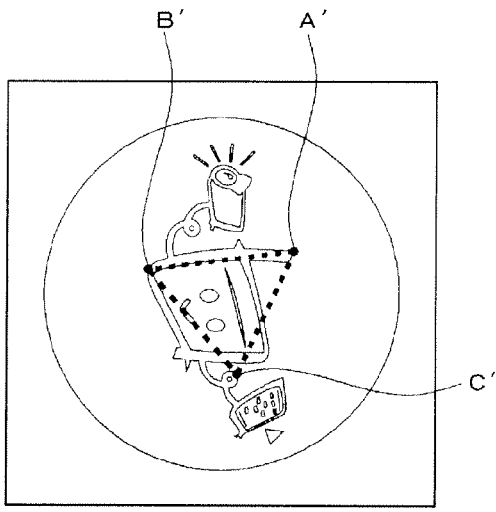

FIG. 3 shows exemplary model image and image to be processed along with a result of the recognition process.

The present example is directed to printed material as its recognition object, and in the figure, a model image and the edge image thereof are shown on the left, whereas an image to be processed and the edge image thereof are shown on the right. Also, in the present example, a particular set of triangles (the triangles ABC and A'B'C') of sets of triangles associated with each other between the images is shown in the edge images.

The triangle is the smallest unit representing a plane, and its relationship to feature points is easily recognizable; therefore, display of edge images as shown in FIG. 3 along with particular triangles on the monitor allows the user to easily recognize the position and rotated state of the object.

Moreover, in the present embodiment, by adjusting the upper and lower limits $d_H$ and $d_L$ defining the range of side lengths of the triangles, the number of triangles to be extracted can be limited. Accordingly, even if the feature points include numerous feature points, by adjusting the range of side lengths of the triangles, the time taken for the matching process is prevented from being prolonged. In addition, defining the range of side lengths according to the shape and size of the object serves to clarify the characteristics of the distribution pattern of the triangles, thereby enhancing the reliability of the goodness of fit.

Accordingly, by means of variable setting of conditions for extraction of the triangles, calculation time can be shortened while accuracy of recognition can be ensured.

Moreover, if the triangles to be extracted are restricted to equilateral triangles, the number of triangles can be significantly reduced, which allows the calculation time to be shortened. Also, in setting the upper and lower limits $d_H$ and $d_L$, the user can easily envisage the relationship between the feature points and the triangles, so that the setting can be made easily.

In the recognition process of the object, if it is desired that the positional displacement, rotational displacement, change in magnification relative to the model be outputted as recognition results, the substantial transformation parameters for affine transformation, i.e., dx, dy, θ, bx, and by, may be specified; however, if it is not necessary, the recognition process may be completed with the specification of an optimal transformation matrix H.

When the transformation matrix H is specified, the image to be processed is transformed with the matrix into a condition similar to the model image, whereon necessary measurement or inspection can be performed. The transformation matrix also enables locating of the points corresponding to predefined reference points, such that a portion to be measured can be specified based on such points.

A detailed description is given below on the process performed by the control section 10 in practicing the above-described recognition processing method.

Figure 4:
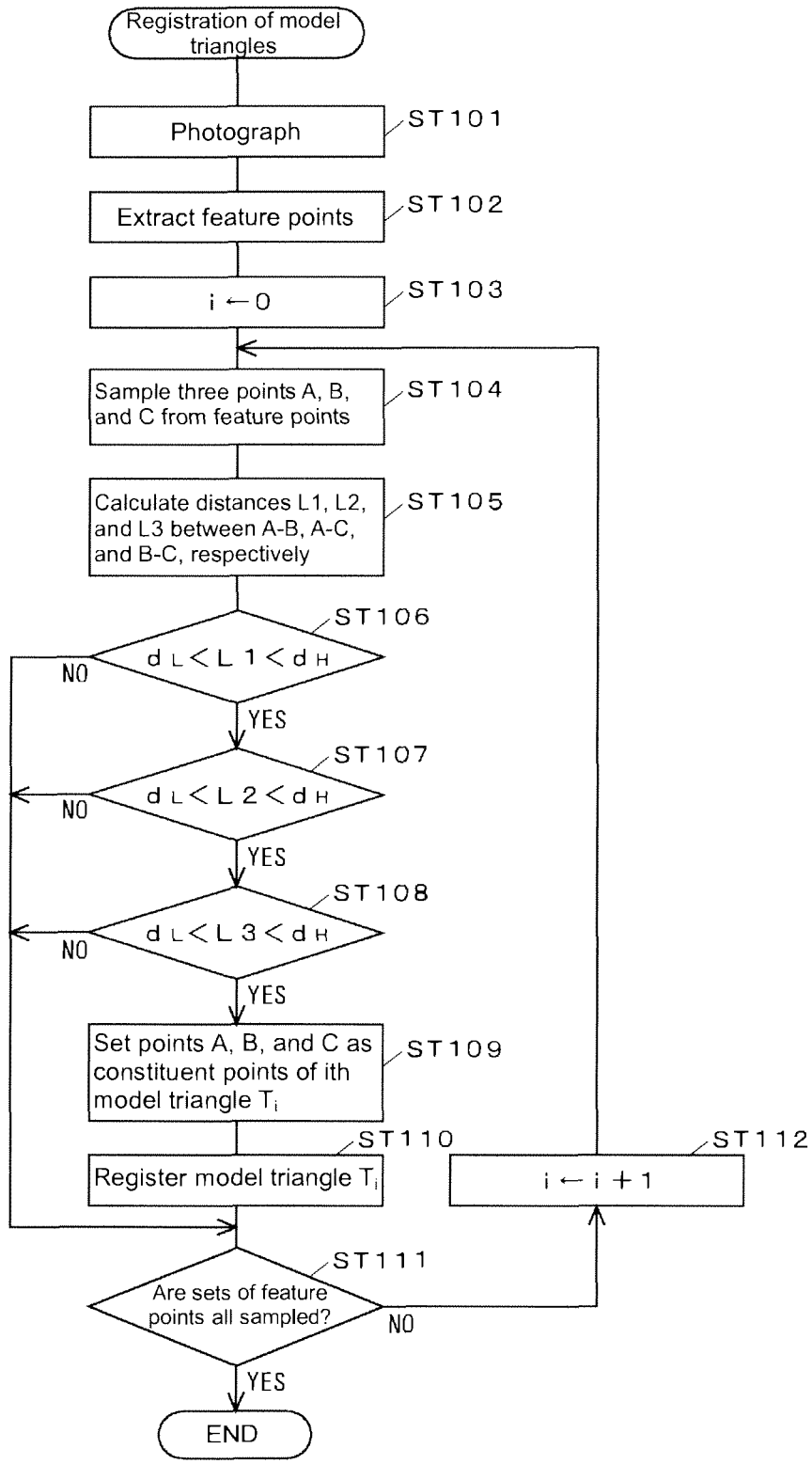
FIG. 4 shows a flowchart describing a flow of a registration process of a model triangle.

First, FIG. 4 shows a flow of a registration process of a model triangle performed prior to a main process. In this process, the user inputs upper and lower limits $d_H$ and $d_L$ of triangles, which values prescribe a condition for extraction of combinations of feature points, and installation of a model for an object in the field of view of the camera 1 prompts the process to be started.

In the initial step 101 (in the following description, the step is abbreviated to "ST"), the installed model is photographed. In ST 102, the edge extraction section 4 extracts feature points (edge constituent points) from the model image generated by the photographing.

The process of setting and registering a model triangle is executed thereafter using the coordinates of the extracted feature points.

First, in ST 103, an initial value of 0 is set to a counter i for specifying a model triangle. In the next ST 104, any three points A, B, and C are sampled out of the extracted feature points. In ST 105, the sampled points are combined in twos, and distances L1, L2, and L3 are calculated for each combination.

In STs 106 to 108, it is checked whether or not the calculated distances L1, L2, and L3 fall within the length range defined by the upper and lower limits $d_H$ and $d_L$. When it is determined that L1, L2, and L3 are all fall within the length range, the process proceeds to ST 109, where the points A, B, and C are set to the constituent points of an ith model triangle $T_i$.

In ST 110, the model triangle $T_i$ is registered. The information registered here has, e.g., a construction in which the coordinates of each of the points A, B, and C are associated with the current value of i.

Up until all sets of feature points are sampled, STs 104 to 110 are repeatedly performed with the value of i updated in ST 112. It should be noted that, if even just one of the distances L1 to L3 between sampled three points is not encompassed by the length range specified by the upper and lower limits $d_H$ and $d_L$, the triangle constituted by the three points is not registered as a model triangle.

When all sets of feature points are sampled, ST 111 provides "YES", so that the model registration process is completed. The value of i at this completion point becomes $i_{max}$ to be described later.

The series of steps shown in FIG. 4 corresponds to the step of setting model combinations out of combinations each made up of n feature points (n=3) of the feature points of the model, the distances between the feature points of each model combination meeting a predefined criterion value, and registering in a memory information for specifying the set model combinations.

Figure 5:
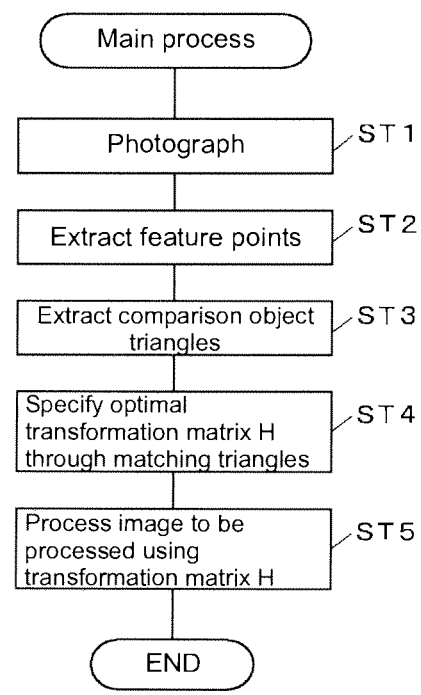
FIG. 5 shows a flowchart describing a flow of a main process.

FIG. 5 shows a flow of the main process. STs 1 to 5 in FIG. 5 are a series of steps executed per object and performed every time an object enters the photographing area of the camera 1.

In ST 1, an object is photographed. In the next ST 2, the edge extraction section 4 extracts feature points from the image to be processed generated by the photographing.

In ST 3, with respect to the feature points extracted in ST 2, comparison object triangles are extracted. Since the procedure for extraction is the same as that described from STs 103 to 112 in FIG. 4, detailed description thereof is not given, while each of the extracted triangles is assigned an identification number j. As information for specifying the comparison object triangles, data that associates each identification number j with the coordinates of the constituent points of each triangle is set and stored in the RAM 13.

The above ST 3 corresponds to the step of setting comparison object combinations out of combinations each made up of n feature points (n=3) of the feature points of a recognition object, the distances between the feature points of each comparison object combination meeting the criterion value.

In ST 4, the registered model triangles are associated with the comparison object triangles in turn to perform specification of an optimal transformation matrix H. This specification allows recognition of the state of the object, such as the position and orientation of the object, in the image to be processed.

Subsequently, in ST 5, processing including correction of the image to be processed and specification of a portion to be measured is performed using the specified transformation matrix H, and then a main measurement process or inspection is carried out.

The above ST 4 embodies the step of associating in turn the model combinations with the comparison object combinations, obtaining per associated combinations a transformation parameter for a case of transforming the feature points of one of the combinations into the feature points of the other combination, and determining goodness of fit of the transformation parameter on a relationship between the feature points of the model and the feature points of the recognition object, and the step of specifying a transformation parameter indicating the correspondence relationship between the feature points of the model and the feature points of the recognition object, based on each goodness of fit. A specific flow of the process relating to these steps is described in detail below with reference to FIG. 6.

In STs 401 and 402, an initial value of 0 is set to a maximum value $C_{max}$ of goodness of fit and to the counter i as initial setting (ST 401). Then, with a model triangle $T_i$ specified based on the value of i, the following process is performed for each triangle $T_i$.

In ST 403, the coordinates of constituent points A, B, and C are read from the registered data of an ith model triangle $T_i$. In the next ST 404, an initial value of 0 is set to a counter j for specifying a comparison object triangle. In ST 405, the coordinates of each constituent point of a jth comparison object triangle $T_j$ are read, and these points are associated with the constituent points A, B, and C of the model triangle $T_i$. While this association includes six different modes, one of these modes is implemented in ST 405. In the subsequent ST 406, an initial value of 1 is set to a counter p indicating the number of times the association is conducted.

In ST 407, the coordinates of each of the associated points are applied to the earlier-described equations (1-1) and (1-2), thereby setting two combinations of three simultaneous equations, and these equations are used to calculate a transformation matrix $H_{ijp}$ for a case of transforming the model triangle $T_i$ into the comparison object triangle $T_j$.

In the following STs 408 to 414, the goodness of fit $C_{ijp}$ of the transformation matrix $H_{ijp}$ is calculated. In ST 408, an initial value of 0 is set to a counter k and to goodness of fit $C_{ijp}$ of the transformation matrix $H_{ijp}$. Next, in ST 409, the coordinates of a kth feature point $A_k$ of the feature points of the model are read. In ST 410, the coordinates of $A_k$ are transformed using the transformation matrix $H_{ijp}$ to set the transformed point as $B_k$.

In ST 411, it is checked whether or not the feature points to be processed includes a point corresponding to the point $B_k$. In the present example, if there is a feature point in the feature points to be processed at the same coordinates as those of $B_k$ of the feature points of the object or within a predetermined distance from the coordinates, that feature point is the corresponding point to $B_k$. In this case, ST 411 provides "YES" and the process proceeds to ST 412, where the goodness of fit $C_{ijp}$ is updated by incrementing the current value by 1.

Meanwhile, if a point corresponding to the transformed $B_k$ is not found, ST 411 provides "NO", and the update of the goodness of fit $C_{ijp}$ is skipped.

The above process is repeated until the value of k reaches the total number $k_{max}$ of the feature points of the model, so that the frequency of the transformed coordinates of the feature points of the model matching the feature points to be processed is calculated as the goodness of fit $C_{ijp}$ of the transformation matrix $H_{ijp}$ on the relationship between the feature points.

When the value of goodness of fit $C_{ijp}$ is fixed with ST 414 turning "YES", in the next ST 415, this $C_{ijp}$ is compared with the maximum value $C_{max}$. If $C_{ijp}$ is larger than $C_{max}$, the process proceeds to ST 416, where $C_{max}$ is replaced with $C_{ijp}$. Also, the transformation matrix $H_{ijp}$ at this point is set as an optimal transformation matrix H.

Thereafter, the correspondence relationship between the constituent points of the triangles $T_i$ and $T_j$ is altered, the counter p is updated to a value increased by 1 (STs 417 to 419), and the process of obtaining a transformation matrix $H_{ijp}$ and its goodness of fit $C_{ijp}$ is executed for freshly associated combinations (STs 407 to 414). The same process is performed for each of the combinations associated with each other in six ways, and upon completion of the process for all the combinations (if "NO" in ST 417), the counter j is updated in ST 420 so as to change the comparison object triangle $T_j$ to another one, and then the process returns to ST 405. Further, the process of obtaining six transformation matrices $H_{ijp}$ and their goodness of fit $C_{ijp}$ with respect to an ith model triangle $T_i$ is performed on all the comparison object triangles, on completion of which ST 421 provides "YES", and the model triangle is changed to another one by alteration of the counter i in ST 422 to return to ST 403.

In this manner, for every combination of i and j, the constituent points of the triangle $T_i$ are associated in six ways with those of the triangle $T_j$, and a transformation matrix $H_{ijp}$ and its goodness of fit $C_{ijp}$ are calculated for each association of the constituent points. When a goodness of fit $C_{ijp}$ exceeds the maximum value $C_{max}$, the maximum value $C_{max}$ is replaced with the goodness of fit $C_{ijp}$, and the optimal transformation matrix H is replaced with the goodness of fit $H_{ijp}$ yielding that maximum value $C_{max}$ at the same time.

All the set model triangles and comparison object triangles are associated with one another in turn, and the above process is performed for each association, whereupon ST 423 provides "YES" to complete the process. H at this completion point is the optimal transformation matrix, i.e., indicates the transformation parameters yielding the maximum goodness of fit.

Figure 6:
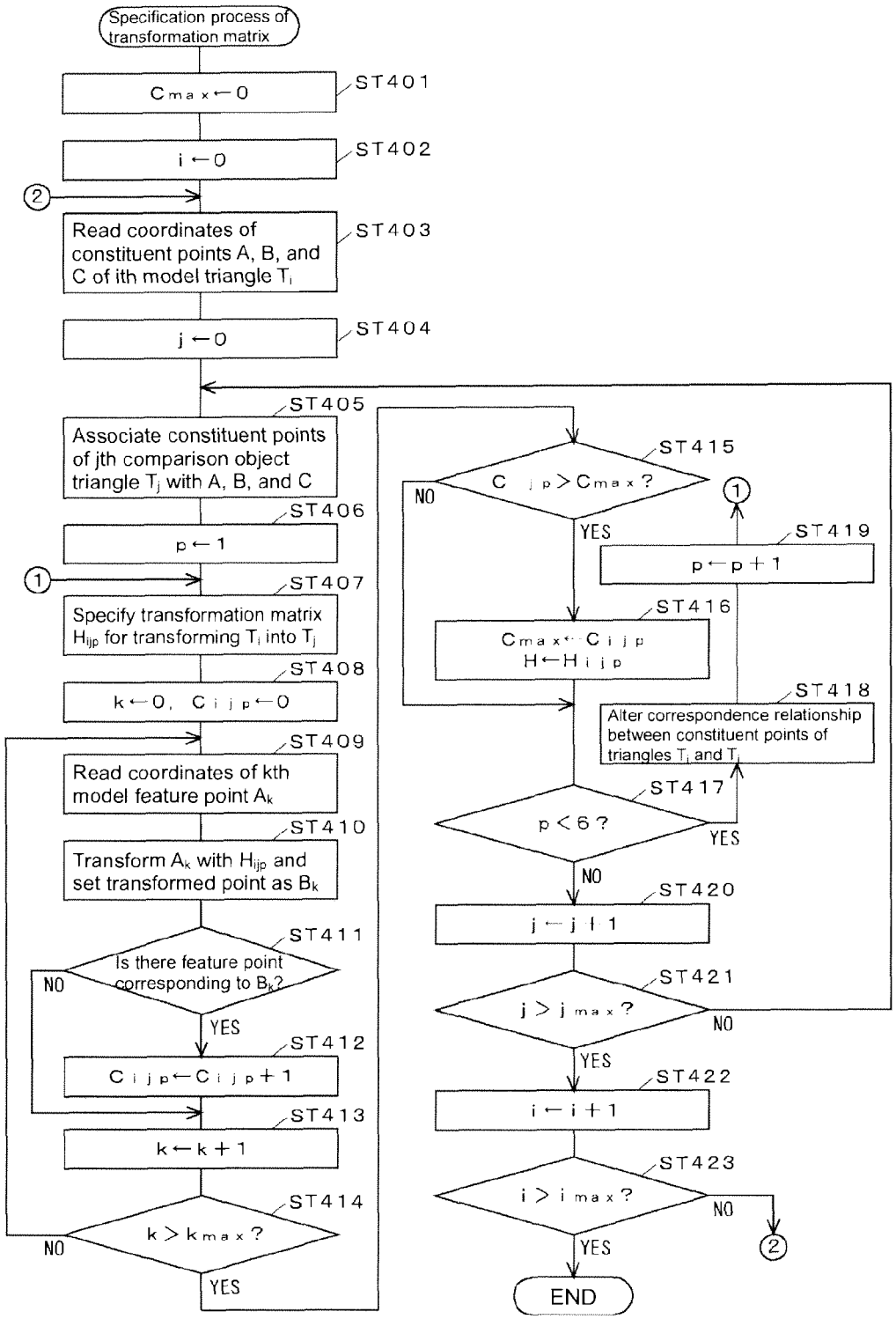
FIG. 6 shows a flowchart describing in detail a flow of a specification process of a transformation matrix.

In the example of FIG. 6, every model triangle is associated with every comparison object triangle and a transformation matrix $H_{ijp}$ and its goodness of fit $C_{ijp}$ are calculated for every set of triangles associated with each other; alternatively, the process in the large loop of STs 403 to 423 may be terminated at the point where the maximum value $C_{max}$ of goodness of fit reaches a predetermined target value. In this manner, although the recognition accuracy may slightly degrade, high speed processing can be achieved. In addition, calculation of goodness of fit $C_{ijp}$ need not be performed for all the feature points of the model, and the coordinates of the feature points set at the vertices of the model triangles may be used to determine goodness of fit $C_{ijp}$. Further, the goodness of fit $C_{ijp}$ is not limited to the number of corresponding points and may be, e.g., a value given by multiplying the number of corresponding points with a predetermined weight, or a percentage of corresponding points to the entire feature points to be processed.

Figure 7:
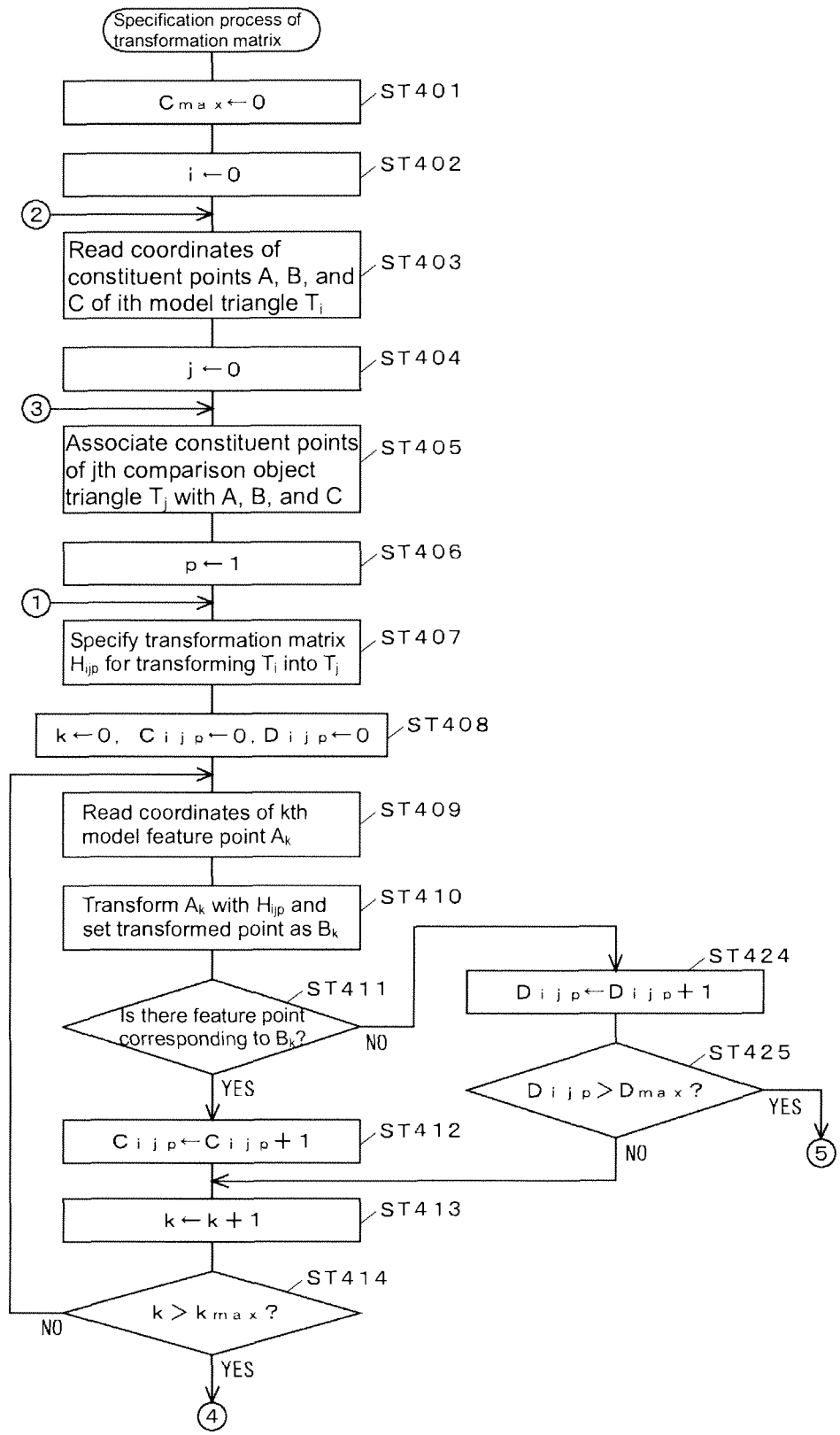
FIG. 7 shows a flowchart describing in detail another exemplary flow of the specification process of a transformation matrix.
Figure 8:
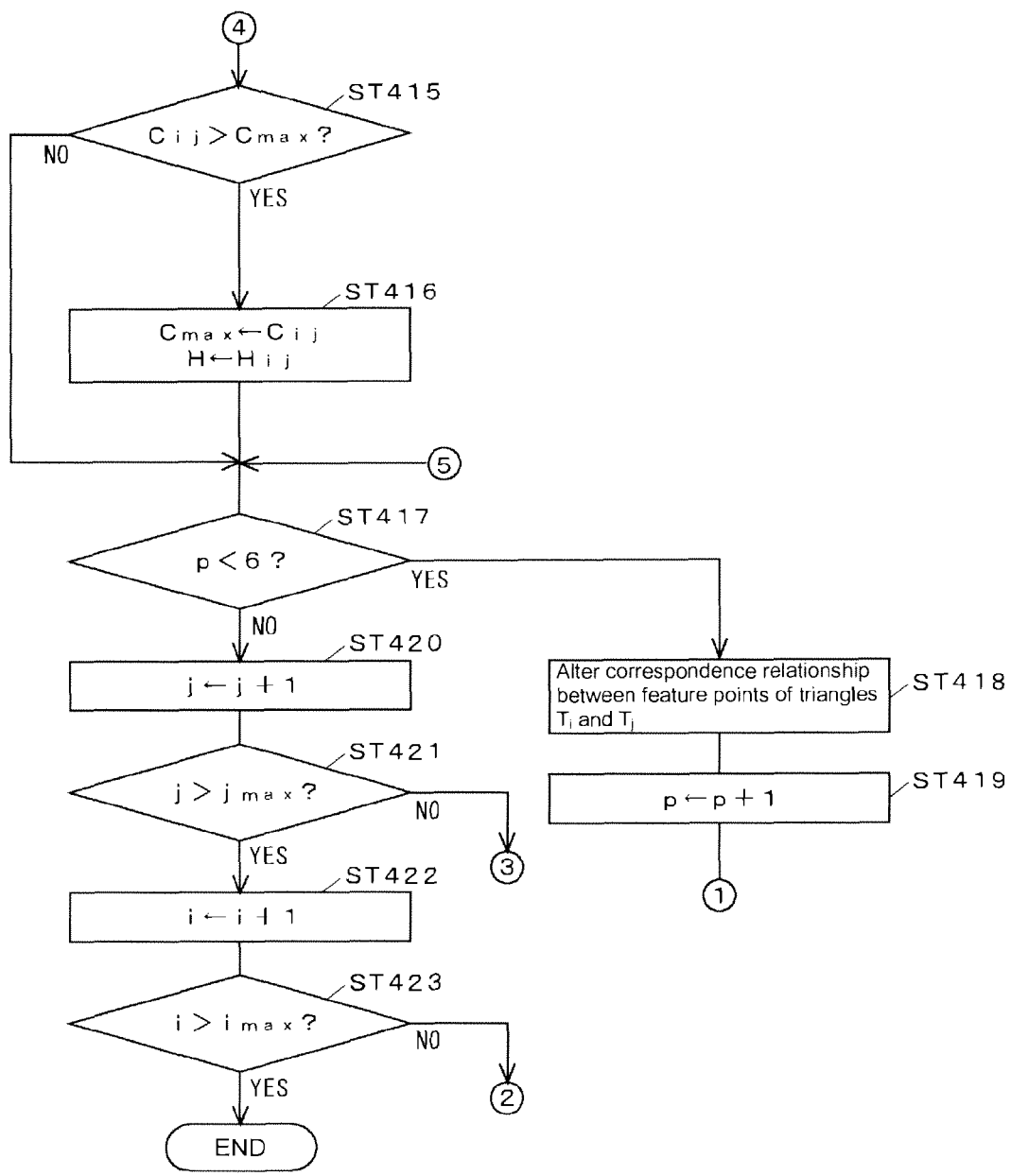
FIG. 8 shows a flowchart continued from FIG. 7.

FIGS. 7 and 8 show another embodiment regarding the process of specifying a transformation matrix. Since most part of the procedure for this process is the same as that shown in FIG. 6, each step is given the same reference numeral as that of FIG. 6, whereby redundant description is eliminated and only the changed part of the process is described.

In the present example, every time a model triangle $T_i$ is associated with a comparison object triangle $T_j$, goodness of fit $C_{ijp}$ or difference $D_{ijp}$ is calculated. Specifically, after ST 410 where the coordinates of a kth model feature point $A_k$ are transformed using a transformation matrix $H_{ijp}$, if the feature points to be processed include a feature point corresponding to the transformed point $B_k$ (if "YES" in ST 411), the goodness of fit $C_{ijp}$ is incremented by 1 (ST 412), whereas if a feature point corresponding to the point $B_k$ is not found (if "NO" in ST 411), the difference $D_{ijp}$ is incremented by 1 (ST 424). When the incremented difference $D_{ijp}$ reaches a predetermined threshold $D_{max}$ (if "YES" in ST 425), the process is terminated thereat and transits to renewal of the association. In ST 408, an initial value of 0 is set to the counter k and the goodness of fit $C_{ijp}$ as well as to the difference $D_{ijp}$.

According to the above process, since calculation of goodness of fit need not be performed to the end for combinations in which association of the constituent points is not properly made, the process can thereby be accelerated.

In the foregoing embodiment, for both the feature points of the model and the feature points to be processed, the model triangles and the comparison object triangles are narrowed down to the triangles whose side length values each fall within the criterion numerical range designated by the upper and lower limits $d_H$ and $d_L$, of the triangles defined by the combinations of the feature points; however, the present invention is not limited thereto, and the triangles may be narrowed down based on the lengths and angles of the sides. For example, it is possible to set as a model triangle and a comparison object triangle a triangle in which the length of at least one side falls within a criterion numerical range and the angles at both the ends thereof fall within a criterion angle range, or a triangle in which the lengths of two sides fall within a criterion numerical range and the angle formed by these sides falls within a criterion angle range. In this case, the inner products of vectors corresponding to the sides may be calculated instead of calculating the angles of the triangle, and the results may be compared with a threshold that is similarly converted in the form of inner product, whereby the calculation is facilitated and a sufficiently high processing speed can be ensured.

As has been described, in the foregoing embodiment, from the viewpoint that, in order to obtain the transformation parameters for affine transformation, feature points of a model be associated with feature points of an object by every three or more sets of the feature points, an optimal transformation matrix H is specified through a matching process using triangles each constructed of three feature points.

Where, however, feature points distributed in a plane such as an image are processed, specification of at least two sets of feature points that are in a correspondence relationship will suffice to estimate, based on the coordinates of these feature points, the coordinates of the remaining one set of corresponding points. For example, two feature points extracted out of feature points may be assumed to correspond to two vertices of an isosceles triangle or two vertices constituting the hypotenuse of a right triangle, and the coordinates of the remaining one vertex may be calculated based on the coordinates of these points.

Accordingly, two feature points may be extracted from feature points of a model and feature points to be processed respectively for association with one another, the coordinates of one set of virtual feature points that are in a correspondence relationship may be calculated separately, and a model triangle and a comparison object triangle may be defined using these three sets of points, thereby calculating a transformation matrix H. In this case also, the calculation flow of the goodness of fit is the same as that shown in STs 407 to 414 of FIG. 6.

It should be noted that, if the number of extracted feature points is simply decreased from three to two, the number of times the combinations of feature points are associated with one another may be increased significantly with prolonged calculation time. Such a process is therefore desirably limited to elongated objects. The reason is that, in the case of an elongated object, limiting the distance between the two points to be extracted according to the length of the object can reduce the number of combinations of feature points, shortening the calculation time.

In the case where a stereo image taken by two cameras is processed to perform three-dimensional measurement and the object is recognized by using the calculated space coordinates, the object can be recognized through a similar method to that applied to the two-dimensional measurement, based on feature points distributed in the space.

In order to specify a relationship between feature points in a three-dimensional space, transformation parameters for homogeneous coordinate transformation need to be specified.

Where the coordinates of a feature point of feature points of a model is $(mX_i, mY_i, mZ_i)$, the coordinates of a corresponding point in feature points to be processed is $(tX_i, tY_i, tZ_i)$, the rotation angle in the x-axis direction of an object relative to the model is $\theta$, the rotation angle in the y-axis direction is $\phi$, and the rotation angle in the z-axis direction is $\psi$, the transformation equation for the homogeneous coordinate transformation is expressed as the following equation (2):

[Equation 2]

$$\begin{pmatrix} tXi \\ tYi \\ tZi \end{pmatrix} = \begin{pmatrix} \cos\phi\cos\phi & -\cos\phi\sin\phi & \sin\phi & 0 \\ \sin\theta\sin\phi\cos\phi + \cos\theta\sin\phi & -\sin\theta\sin\phi\sin\phi + \cos\theta\cos\phi & -\sin\theta\cos\phi & 0 \\ -\cos\theta\sin\phi\cos\phi + \sin\theta\sin\phi & \cos\theta\sin\phi\sin\phi + \sin\theta\cos\phi & \cos\theta\cos\phi & 0 \end{pmatrix} \begin{pmatrix} mXi \\ mYi \\ mZi \\ 1 \end{pmatrix} = H1 \cdot \begin{pmatrix} mXi \\ mYi \\ mZi \\ 1 \end{pmatrix} \quad (2)$$

According to the equation (2), if it is possible to specify three sets of feature points that are in a correspondence relationship between the feature points of the model and the feature points to be processed, with the coordinates of these points set as $(mX_i, mY_i, mZ_i)$ and $(tX_i, tY_i, tZ_i)$, three combinations of three simultaneous equations can be established according to the above equation (2), and a transformation matrix H1 can thereby be obtained. Accordingly, a plurality of model triangles are extracted for registration from the three-dimensional model, the space coordinates of a plurality of feature points are obtained through three-dimensional measurement performed on a stereo image of the object, comparison object triangles are extracted therefrom, and the triangles are matched with one another in the same procedure as shown in FIG. 6, whereby an optimal transformation matrix can be obtained.

Figure 9:
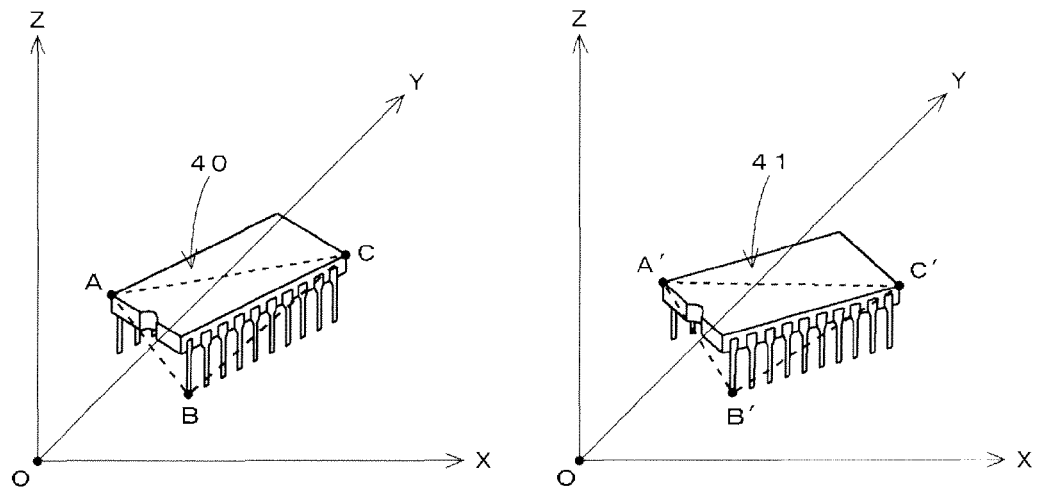
FIG. 9 shows an illustration of exemplary three-dimensional model and recognition object along with a correspondence relationship between feature points.

FIG. 9 shows an exemplary three-dimensional recognition process directed to ICs.

In this recognition process, a space coordinate system XYZ is set with a predetermined position in the space as the origin O, the space coordinates of a plurality of feature points are calculated each for a three-dimensional model 40 and an IC 41 to be recognized, and the above-described matching process of triangles is performed using the results of the calculation. In the present example also, like the previous example of FIG. 3, a particular set (triangles ABC and A'B'C') is shown from among various triangles in a correspondence relationship.

According to the above recognition process, for example in an inspection of IC leads, the coordinates (corresponding to the coordinates of the point B' in FIG. 9) of the tip of a first lead of the IC 41 to be recognized are located, and with reference to these coordinates, the coordinates of the tips of other leads are further located, so that it can be determined whether or not the heights of the tips are all equal to one another.

In the case where the above recognition process is applied to the control of an assembly process performed by a robot, suction points may be set in a central portion of the upper surface of the IC 41 to be recognized based on, e.g., the coordinates of the points A' and C', and control can be performed such that a suction nozzle of a robot arm are moved to the set points.

Figure 10:
FIG. 10 shows an illustration of an exemplary picking system using three-dimensional recognition processing.
Figure 10:
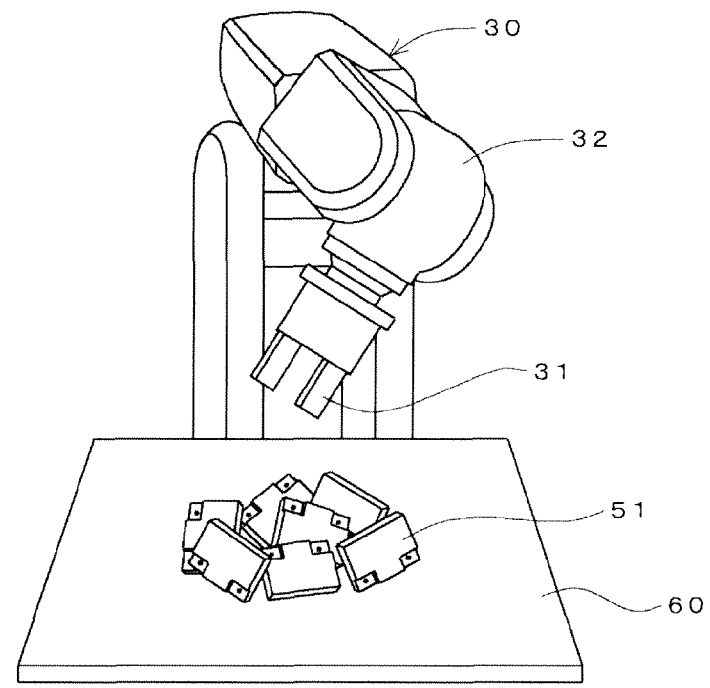
Figure 11:
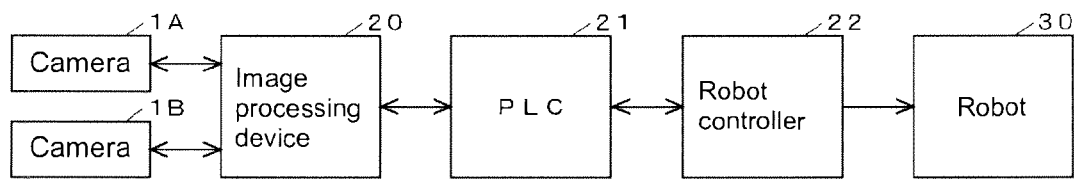
FIG. 11 shows a block diagram of the picking system.

FIGS. 10 and 11 show a specific example of a component picking system to which the above three-dimensional recognition process is applied.

The system is used for picking components 51 that are randomly stacked on a support table 60 one component at a time, transporting them to a separate place, and arranging them in an aligned manner, and a robot 30 responsible for the picking operation as well as two cameras 1A and 1B is disposed locally. The system further includes an image processing device 20 for three-dimensional recognition processing, a PLC (programmable logic controller) 21, and a robot controller 22.

The robot 30 includes a multi-joint arm 32 provided with a hand 31 at its tip and is connected to the robot controller 22. In response to control signals from the PLC 21, the robot controller 22 controls the operations of each joint of the arm 32 and of the hand 31 so as to set the position and direction of the hand 31, thereby causing the hand 31 to grip or transport a component 51.

The cameras 1A and 1B are connected to the image processing device 20. As the configuration of the image processing device 20 is almost the same as that shown in FIG. 1, detailed description thereof is not given, except that the image input section 3, the edge extraction section 4, and the image memory 5 are provided individually in each of the cameras 1A and 1B. The image processing device 20 is set so as to output trigger signals in response to an instruction from the PLC 21, simultaneously to the cameras 1A and 1B.

The image processing device 20 performs three-dimensional recognition processing using the images from the cameras 1A and 1B to recognize one of the randomly stacked components, and outputs the three-dimensional coordinates designating the position of the component and angle data representing the attitude. The PLC 21 uses data outputted from the image processing device 20 to perform calculation of data representing the position and attitude of the hand 31 of the robot 30, and supplies the calculated data to the robot controller 22. The robot controller 22 decides amounts of movement for the arm 32 and the hand 31 of the robot based on the data supplied from the PLC 21, and the parts 31 and 32 are controlled accordingly. In this manner, it is possible to pick up the components recognized by means of the image processing device 20 and to transport them to a predetermined place.

Also in the present embodiment, a predetermined number of feature points are extracted in advance from a three-dimensional model for the components 51 to be recognized, and model triangles are thereby set and registered in the image processing device 20. In the picking process, the three-dimensional coordinates of a plurality of feature points are located using the images photographed by the cameras 1A and 1B, a comparison object triangle and a model triangle that are defined by these feature points are then matched with each other, thereby specifying an optimal transformation matrix for describing the relationship between the feature points of the model and the feature points to be processed. Further, based on the specified transformation matrix, data representing the position and attitude of the component to be picked is calculated.

Figure 12:
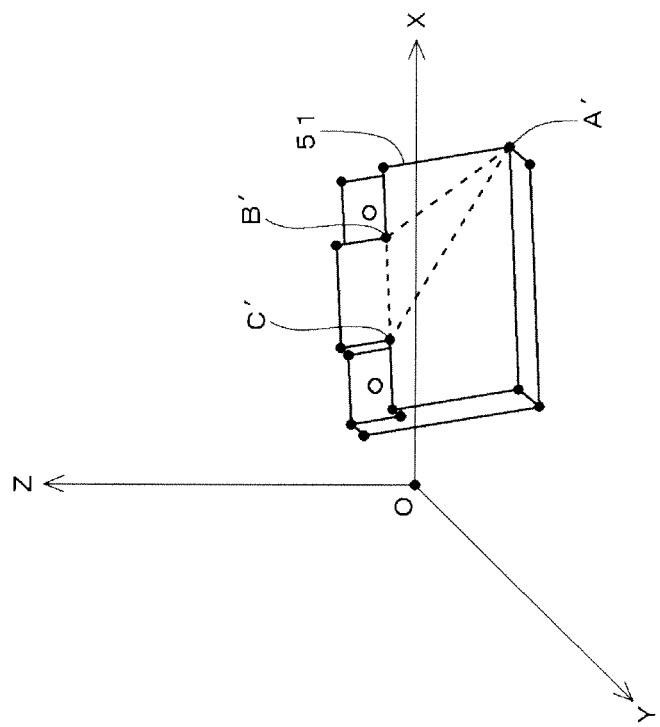
FIG. 12 shows an illustration of a three-dimensional model for a component to be picked and an actual component along with a correspondence relationship between feature points.
Figure 12:
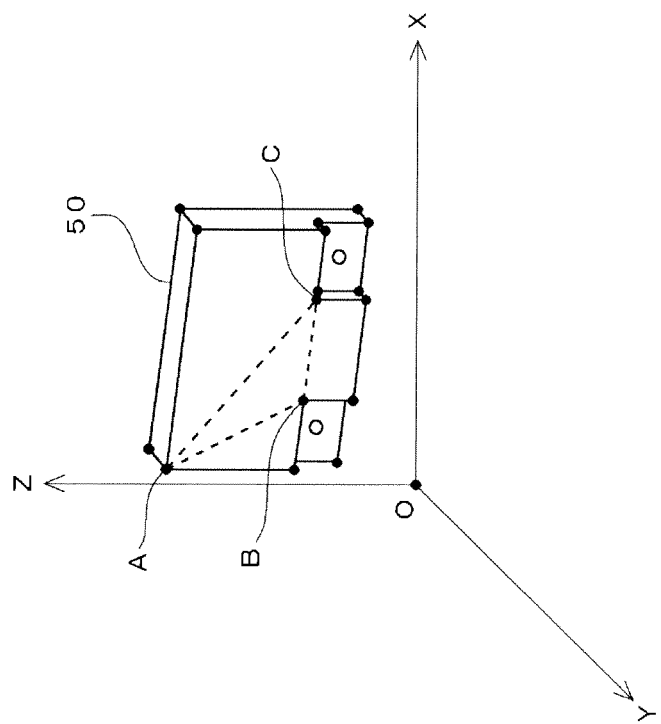

FIG. 12 shows exemplary feature points along with a particular set of triangles (triangles ABC and A'B'C') that are in a correspondence relationship.

In the present embodiment, feature points are set by the coordinates of the vertices at the corners of a three-dimensional model 50 for a component 51 to be recognized when the model 50 is disposed in a predetermined attitude in a space coordinate system XYZ, and of triangles defined by these feature points, the triangles whose side lengths each fall within a predetermined numerical range (inputted by the user as in the first embodiment) are registered as model triangles. Meanwhile, with respect to the component 51 to be recognized, images from the cameras 1A and 1B are converted to edge images, and then the edge constituent points corresponding to the vertices at the corners are located from the edge images, thereby setting comparison object triangles based on the three-dimensional coordinates obtained for the edge constituent points. The comparison object triangles are also limited to those whose side lengths each fall within the same numerical range as that of the model triangles.

To locate the vertices at the corners, for example, the contour formed by the edge constituent points in the edge images may be segmented into straight lines, curves, and the like, and the intersection points of the segments may be obtained. In the case where the contour of the recognition object is linear as in the example of FIG. 12, it is also possible that a virtual straight line is set along a direction orthogonal to the direction of gradient for each edge constituent point, the straight lines approximate in direction are integrated into groups, and the intersection points of the straight lines are obtained as feature points.

It should be noted that feature points are not limited to intersection points of edges. For example, if the object has a curved contour, curved segments may be extracted, and based on the amount of change in curvature, e.g., the points at which a gentle slope suddenly changes to a steep slope may be extracted as feature points.

Feature points of the three-dimensional model can be obtained by conducting the same three-dimensional measurement process as the above using an actual component 51 as the model, whilst in the case where CAD data of the component 51 is available, the feature points as above may be extracted from the three-dimensional contour delineated by the CAD data.

In the present embodiment, since a plurality of recognition objects are photographed, more edge constituent points are extracted from the images of the cameras 1A and 1B than in the case of processing only one object; however, the feature points may be narrowed down to constituent points of a characteristic contour shape of the object, so that the calculation load can be curtailed. Also, for setting model triangles and comparison object triangles, a condition may be provided on the lengths, angles, and the like of the triangles according to the shape of the object, whereby accurate recognition processing can be performed with the reduced number of triangles. It should be noted that, when the number of feature points is decreased, it becomes difficult to set a condition regarding setting of the triangles; therefore, in the case where a non-skilled user conducts the process or the recognition object is frequently changed, all the edge constituent points may be set as feature points without narrowing down the feature points.

Figure 13:
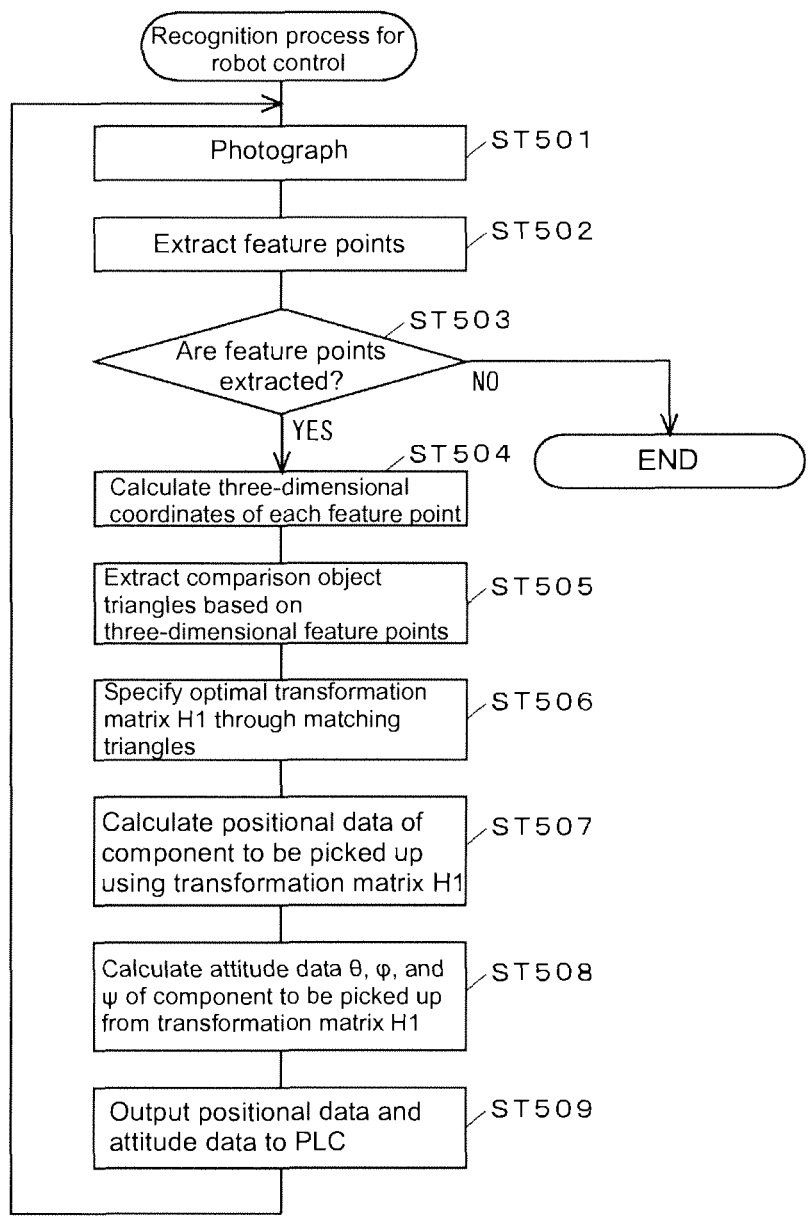
FIG. 13 shows a flowchart describing a flow of a recognition process implemented in an image processing device for control of a robot.

A flow of a process executed in the image processing device 20 for controlling the operation of the robot 30 is described with reference to FIG. 13.

First, in ST 501, trigger signals are outputted to the cameras 1A and 1B in response to an instruction from the PLC 21 to cause the cameras to perform photographing. In the next ST 502, feature points are extracted from the images inputted from the cameras 1A and 1B. At this point, the inputted images may be converted to edge images by the respective edge extraction sections 4, whereon a plurality of edge constituent points such as the above-mentioned vertices at the corners may be located so as to set them as feature points. Alternatively, all the edge constituent points may be set as feature points.

When the feature points are extracted, ST 503 provides "YES", and in ST 504, three-dimensional coordinates are calculated for the extracted feature points. Specifically, the feature points are associated with one another between the images, and for each set of the associated points, such calculation is performed that the coordinates of each point is applied to an equation according to a principle of triangulation, whereby the three-dimensional coordinates of these points are calculated.

Thereafter, in ST 505, with respect to the feature points indicated by the calculated three-dimensional coordinates, extraction of comparison object triangles is performed. In ST 506, the comparison object triangles are associated with the pre-registered model triangles in turn, and calculation of a transformation matrix and the goodness of fit of the matrix is performed per associated combinations, thereby specifying an optimal transformation matrix H1 (a transformation matrix yielding maximum goodness of fit) for the feature points to be processed. The details of ST 505 are almost the same as the previously described flow of the process shown in FIG. 6 or FIGS. 7 and 8, except that calculation of homogenous coordinate transformation (the equation (2)) is performed.

When the optimal transformation matrix H1 is specified, in ST 507, a representative point predefined for the three-dimensional model 50 is transformed with the transformation matrix H1, and the transformed coordinates are set as positional data of a component to be picked up. In addition, in ST 508, the parameters $\theta$, $\phi$, and $\psi$ of the homogenous coordinate transformation are calculated using the elements of the specified transformation matrix H1, and the combination thereof is set as attitude data of the component to be picked up.

While one of the feature points (e.g. the point A of FIG. 12) may be set as the representative point of the three-dimensional model 50, the present invention is not limited thereto, and a point other than an edge constituent point (e.g. the median point of the triangle ABC of FIG. 12) may be set as the representative point.

In ST 509, the positional data calculated in ST 507 and the attitude data defined by the angles $\theta$, $\phi$, and $\psi$ that is calculated in ST 508 are outputted to the PLC 21. In response to the output, the PLC 21 calculates data for controlling the robot and outputs the data to the robot controller 22. The robot controller 22 controls the operation of the robot 30 based on the data supplied from the PLC 21, through which the robot 30 is caused to grip the recognized component to be picked up and to transport it to the outside of the photographing area.

When the transportation process is completed and the PLC 21 is informed by the robot controller 22 to that effect, the PLC 21 instructs the image processing device 20 to output next trigger signals for the next photographing.

On completion of the data output, the process in the image processing device 20 returns to ST 501, where the photographing area after removal of the above component is photographed in response to an instruction from the PLC 21. Further, the process from ST 502 and onwards is performed, whereby the position and rotation angle of a component to be picked up next are obtained for output to the PLC 21.

The process from STs 501 to 509 is likewise repeated thereafter, so that the randomly stacked components are recognized one by one and transported by the robot 30 under the control based on the result of the recognition. Consequently, when all the components have been transported and no feature point is included in the photographed images, ST 503 provides "NO" to complete the process.

It should be noted that, if an entire image of the components 51 is not generated due to, e.g., deviation of the randomly stacked position of the components 51 to be recognized from the fields of view of the cameras 1A and 1B, even the maximum goodness of fit may have a very low value. In order to accommodate to such a case, it is desirable that the recognition process of the components 51 be terminated and error processing be performed, if maximum goodness of fit goes below a predetermined criterion value. In this regard, the same holds true for the foregoing two-dimensional recognition processing.

In the above description, in ST 506, the optimal transformation matrix H1 is specified as a transformation matrix that yields maximum goodness of fit. The larger the goodness of fit of a transformation matrix, the more frequently the points given by transforming the feature points of the model using the transformation matrix match the feature points to be processed; therefore, selection of a transformation matrix that yields maximum goodness of fit allows recognition of a component 51 with the largest number of points corresponding to the feature points of the model, from among a plurality of randomly stacked components 51. In other words, a component 51 that is most exposed, or rather, a component 51 that can be picked up by the robot 30 most easily, can be recognized.

It should be noted that the optimal transformation matrix H1 to be specified is not limited to the above. For example, the optimal transformation matrix H1 may be set in such a way that transformation matrices whose goodness of fit is above a predetermined criterion value are all picked out as candidates for the transformation matrix H1, the coordinates of a representative point of the three-dimensional model are transformed with the candidate transformation matrices, and a transformation matrix that provides a transformed Z coordinate at the highest position is selected. In this case, a component at the top of the randomly stacked components 51 can be recognized.

Further, in the above system, a single optimal transformation matrix is specified from the transformation matrices that are obtained per association, out of the necessity that a single object (component 51) be located; however, the present invention is not limited thereto, and depending of the use, a plurality of transformation matrices whose goodness of fit is above a criterion value may be specified, and a single object may be recognized for each specified transformation matrix. In this manner, even in the case where a plurality of robots 30 are operated, it is possible to individually recognize components 51 to be gripped by each robot 30.

The scope of application of the three-dimensional recognition process is not limited to the result of the measurement process using stereo images as described above. For example, the process may be applied to the result of three-dimensional measurement according to a method wherein a predetermined area is scanned with a displacement sensor and the distance to the object is measured at a plurality of points.

In the above embodiments according to the two-dimensional and three-dimensional image processing, the feature points of the model and the feature points to be processed are edge constituent points, but the feature points are not limited thereto. For example, where a region with a particular color is processed, pixels having the color may be extracted as feature points.

The invention claimed is:

1. A computer-implemented method for recognizing a recognition object based on a correspondence relationship between feature points of the recognition object and pre-registered feature points of a model, the feature points being distributed in a plane or a space, the method comprising the steps of:
   (i) setting model combinations out of combinations each made up of a particular number n (n≥2) of feature points of the feature points of the model, the distance between at least a pair of feature points of each model combination meeting a predefined criterion value, and registering in a memory information for specifying the set model combinations;
   (ii) setting comparison object combinations out of combinations each made up of the particular number n of feature points of the feature points of the recognition object, the distance between at least a pair of feature points of each comparison object combination meeting the criterion value;
   (iii) associating in turn the model combinations specified by the registered information in the memory with the comparison object combinations set in the (ii) step, obtaining per associated combinations a transformation parameter for a case of transforming the feature points of one of the combinations into the feature points of the other combination, and determining goodness of fit of the transformation parameter on a relationship between the feature points of the model and the feature points of the recognition object; and
   (iv) based on each goodness of fit obtained in the (iii) step, specifying a transformation parameter indicating the correspondence relationship between the feature points of the model and the feature points of the recognition object, wherein in the (i) and (ii) steps, the particular number n is set to three, and such combinations of feature points are set as to constitute a triangle whose side lengths each have a value between a predetermined upper limit and a predetermined lower limit,
   wherein in the (iii) step, after the transformation parameter is obtained for a model combination and a comparison object combination that are associated with each other, either three-dimensional coordinates of the feature points of the model or the feature points of the recognition object are transformed using the transformation parameter, each of the transformed three-dimensional coordinates of the transformed feature points is determined whether or not to match a corresponding one of each of the three-dimensional coordinates of the non-transformed feature points, and a numerical value indicating frequency of the transformed three-dimensional coordinates of the transformed feature points matching three-dimensional coordinates of the non-transformed feature points is set as the goodness of fit of the transformation parameter;
wherein in the (iv) step, specifying the transformation parameter includes comparing the numerical value indicating goodness of fit with a predetermined goodness of fit value.

2. The method according to claim 1, wherein the feature points to be processed are a set of feature points included in an image of the recognition object.

3. The method according to claim 1, wherein in the (i) and (ii) steps, such combinations of feature points are set as to constitute an equilateral triangle whose side length has a value between the upper and lower values.

4. The method according to claim 1, wherein the angles at both ends of the side of the triangle each fall within a predefined criterion angle range.

5. An image processing device performing acquisition of a plurality of feature points of a recognition object that are distributed in a plane or a space through processing on an image of the recognition object, and recognition of the recognition object based on a correspondence relationship between the feature points and pre-registered feature points of a model, the device comprising:
input means for inputting a predetermined criterion value for the inter-feature-point distance of the feature points;
model setting means for setting model combinations out of combinations each made up of a particular number n (n≥2) of feature points of the feature points of the model, the distance between at least a pair of feature points of each model combination meeting the criterion value;
registering means for registering in a memory information for specifying the model combinations set by the model setting means;
combination setting means for setting comparison object combinations out of combinations each made up of the particular number n of feature points of the feature points extracted from the input image, the distance between at least a pair of feature points of each comparison object combination meeting the criterion value;
matching means for associating in turn the model combinations specified by the registered information in the memory with the comparison object combinations set by the combination setting means, obtaining per associated combinations a transformation parameter for a case of transforming the feature points of one of the combinations into the feature points of the other combination, and determining goodness of fit of the transformation parameter on a relationship between the feature points of the model and the feature points of the recognition object; and
specifying means for specifying a transformation parameter indicating the correspondence relationship between the feature points of the model and the feature points of the recognition object, based on each goodness of fit determined by the matching means,
wherein the particular number is set to three, and such combinations of feature points are set as to constitute a triangle whose sides each have a value between a predetermined upper limit and a predetermined lower limit,
wherein after the transformation parameter is obtained for a model combination and a comparison object combination that are associated with each other, either three-dimensional coordinates of the feature points of the model or the feature points of the recognition object are transformed using the transformation parameter, each of the transformed three-dimensional coordinates of the transformed feature points is determined whether or not to match a corresponding one of each of the three-dimensional coordinates of the non-transformed feature points and a numerical value indicating frequency of the transformed three-dimensional coordinates of the transformed feature points matching three-dimensional coordinates of the non-transformed feature points is set as the goodness of fit of the transformation parameter;
wherein specifying the transformation parameter includes comparing the numerical value indicating goodness of fit with a predetermined goodness of fit value.

6. An image processing device performing input of images from a plurality of photographing devices installed to photograph a plurality of recognition objects having the same shape, acquisition of the space coordinates of a plurality of feature points of each recognition object that are distributed in a space through a three-dimensional measurement process using the input images, and individual recognition of the plurality of recognition objects based on a correspondence relationship between the feature points and pre-registered feature points of a model, the device comprising:
input means for inputting a predetermined criterion value for the inter-feature-point distance of the feature points;
model setting means for setting model combinations out of combinations each made up of a particular number n (n≥3) of feature points of the feature points of the model, the distance between at least a pair of feature points of each model combination meeting the criterion value;
registering means for registering in a memory information for specifying the model combinations set by the model setting means;
combination setting means for setting comparison object combinations out of combinations each made up of the particular number n of feature points of the feature points acquired through the three-dimensional measurement, the distance between at least a pair of feature points of each comparison object combination meeting the criterion value;
matching means for associating in turn the model combinations specified by the registered information in the memory with the comparison object combinations set by the combination setting means, obtaining per associated combinations a transformation parameter for a case of transforming the feature points of one of the combinations into the feature points of the other combination, and determining goodness of fit of the transformation parameter on a relationship between the feature points of the model and the feature points of each recognition object; and
object recognizing means for specifying at least one of the goodnesses of fit determined by the matching means, the goodness of fit being above a predetermined criterion value, and recognizing one recognition object per specified goodness of fit using the transformation parameter corresponding to the goodness of fit, wherein the particular number is set to three, and such combinations of feature points are set as to constitute a triangle whose sides each have a value between a predetermined upper limit and a predetermined lower limit,
wherein after the transformation parameter is obtained for a model combination and a comparison object combination that are associated with each other, either three-dimensional coordinates of the feature points of the model or the feature points of the recognition object are transformed using the transformation parameter, each of the transformed three-dimensional coordinates of the transformed feature points is determined whether or not to match a corresponding one of each of the three-dimensional coordinates of the non-transformed feature points, and a numerical value indicating frequency of the transformed three-dimensional coordinates of the transformed feature points matching three-dimensional coordinates of the non-transformed feature points is set as the goodness of fit of the transformation parameter;

wherein obtaining the transformation parameter includes comparing the numerical value indicating goodness of fit with a predetermined goodness of fit value.

* * * * *